United States Patent
Kim et al.

(10) Patent No.: US 9,584,537 B2
(45) Date of Patent: Feb. 28, 2017

(54) SYSTEM AND METHOD FOR DETECTING MOBILE CYBER INCIDENT

(71) Applicant: KOREA INTERNET & SECURITY AGENCY, Seoul (KR)

(72) Inventors: Byung Ik Kim, Seoul (KR); Tai Jin Lee, Seoul (KR); Hong Koo Kang, Seoul (KR); Seul Gi Lee, Seoul (KR); Hyei Sun Cho, Seoul (KR)

(73) Assignee: KOREA INTERNET & SECURITY AGENCY (KR)

( * ) Notice: Subject to any disclaimer, the term of this patent is extended or adjusted under 35 U.S.C. 154(b) by 0 days.

(21) Appl. No.: 15/171,305

(22) Filed: Jun. 2, 2016

(65) Prior Publication Data
US 2016/0277430 A1   Sep. 22, 2016

Related U.S. Application Data (62) Division of application No. 14/602,602, filed on Jan. 22, 2015.

(30) Foreign Application Priority Data

Jan. 14, 2015   (KR) .......................... 10-2015-0006948

(51) Int. Cl.
*G06F 3/00* (2006.01)
*H04L 29/06* (2006.01)
(Continued)

(52) U.S. Cl.
CPC ..... *H04L 63/1425* (2013.01); *G06F 17/30097* (2013.01); *G06F 17/30867* (2013.01); *H04L 51/08* (2013.01); *H04L 63/145* (2013.01); *H04L 63/1416* (2013.01); *H04W 4/12* (2013.01); *H04W 4/003* (2013.01); *H04W 88/184* (2013.01)

(58) Field of Classification Search
USPC .......................................... 726/23
See application file for complete search history.

(56) References Cited

U.S. PATENT DOCUMENTS

| 8,370,342 B1 * | 2/2013 | Li ...................... G06F 17/30864 707/708 |
| 2004/0064515 A1 * | 4/2004 | Hockey ................. G06F 21/562 709/206 |

(Continued)

OTHER PUBLICATIONS

Lee, et al., A study on the Presumption of Same Attacker Using Mobile Malware Collection and Analysis Information, Digital Contents Society and Society of Mobile Technology, Dec. 13, 2014.

*Primary Examiner* — Joseph P Hirl
(74) *Attorney, Agent, or Firm* — Cantor Colburn LLP (57) ABSTRACT

A method for detecting mobile cyber incidents includes: allowing a mobile incident collection server to determine whether new text is received; extracting the text original hash from the received new text by means of the mobile incident collection server; allowing the mobile incident collection server to determine whether attached file exists on the basis of the extracted text original hash; if the attached file exists, extracting the attached file by means of the mobile incident collection server; and storing and managing the APP information of the extracted attached file as mobile cyber incident information in the mobile incident collection server.

1 Claim, 4 Drawing Sheets

(51) Int. Cl.
*G06F 17/30* (2006.01)
*H04L 12/58* (2006.01)
*H04W 4/12* (2009.01)
*H04W 4/00* (2009.01)
*H04W 88/18* (2009.01)

(56) References Cited

U.S. PATENT DOCUMENTS

| | | | |
|---|---|---|---|
| 2008/0256187 A1* | 10/2008 | Kay | H04L 12/585 |
| | | | 709/206 |
| 2011/0219451 A1* | 9/2011 | McDougal | G06F 21/562 |
| | | | 726/23 |
| 2013/0151526 A1* | 6/2013 | Jeong | H04L 67/22 |
| | | | 707/737 |
| 2013/0179421 A1* | 7/2013 | Jeong | G06F 17/30882 |
| | | | 707/706 |
| 2016/0117235 A1* | 4/2016 | Mishra | G06F 11/368 |
| | | | 714/38.1 |

* cited by examiner

SYSTEM AND METHOD FOR DETECTING MOBILE CYBER INCIDENT

CROSS REFERENCE TO RELATED APPLICATION

This is a divisional application of U.S. Ser. No. 14/602,602, filed on Jan. 22, 2015, which claims the benefit of Korean Patent Application No. 10-2015-0006948 filed in the Korean Intellectual Property Office on Jan. 14, 2015, the entire contents of which are incorporated herein by reference.

BACKGROUND OF THE INVENTION

Field of the Invention

The present invention relates to a system and method for detecting mobile cyber incidents, and more particularly, to a system and method for detecting mobile cyber incidents that collects information on all of paths through which mobile malicious codes spread to detect the mobile cyber incidents generated from the mobile malicious codes.

Background of the Related Art

Recently, mobile terminal users have been drastically increased. The populations using mobile terminals in the first quarter of 2014 reach about 6.8 billion all over the world, and especially, the number of new mobile users in 2013 is 2 billion. The mobile terminal users are drastically increased because internet is freely used without any limitations in time and space and the friendliness among the users is improved through services like SNS (Social Networking Service). Further, they obtain many conveniences like financial service availability, free service coupons issuing and so on through simple procedures.

Recent mobile terminals, which provide conveniences through various applications and support fast internet services, are called 'smartphones'.

Such smartphones store and manage various kinds of personal information. That is, they store telephone numbers, text messages, bank account numbers for financial services, password numbers, authenticated certificates, card numbers and the like.

Like this, since the smartphones store various kinds of personal information therein, they may be attacked by hackers, but unfortunately, the smartphone users do not recognize the attacks from the hackers well.

According to Kaspersky Lab, PC and mobile malicious code analyzing company, the mobile malicious codes found in the second quarter of 2014 are 65,118, and the APK (Android Application Package) files installing the malicious codes are 727,790.

The malicious codes operating for mobile banking among the mobile malicious codes are 2,033. The number of total mobile malicious codes is lower than that in the first quarter of 2014, but the number of mobile banking malicious codes is greater by two times than in the first quarter of 2014. More than 90% of the mobile banking malicious codes are found in Russia, and even in Korea, 30 mobile banking malicious codes are detected.

Accordingly, the incidents using the mobile malicious codes have been increased, and they are handled with mobile vaccine. The mobile vaccine analyzes the mobile malicious codes, creates information for detecting the mobile malicious codes, transmits the information to a user, and provides a function of detecting the malicious codes. However, actually, most of mobile users do not use the mobile vaccine.

According to Korea Internet & Security Agency, it is investigated that only about 33.5% of the mobile terminal users adopt mobile vaccine. So as to make a vaccine signature detecting mobile malicious codes, specific information on the malicious codes should be extracted through manual analysis of analyzers. Further, a method for deleting the detected malicious codes should be found and sent to the user.

However, lots of systems for collecting the mobile malicious codes to be checked do not exist. At present, the mobile applications suspected on malicious behaviors are received from a user or the applications suspected in application market are collected. The systems for collecting the mobile malicious codes by means of the sharing of the application through downloading, black markets and blogs have been not sufficient. Accordingly, the attackers who spread the mobile malicious codes insert download link into web sites or connect application download addresses through SMS (Short Message Service)/MMS (Multimedia Message Service).

Moreover, the collected applications are analyzed directly by analyzers, and accordingly, the number of collected applications to be analyzed is limited. The system assisting the analysis has been recently developed as a tester, and further, the determination whether malicious behavior exists in the analyzed results of the system has to be made by the analyzers.

SUMMARY OF THE INVENTION

Accordingly, the present invention has been made in view of the above-mentioned problems occurring in the prior art, and it is an object of the present invention to provide a system and method for detecting mobile cyber incidents that collects information on all of paths through which mobile malicious codes spreads to detect the mobile cyber incidents generated from the mobile malicious codes.

It is another object of the present invention to provide a system and method for detecting mobile cyber incidents that informs applications suspected on malicious behavior and the information on the applications to a manager and conducts manual analysis only for the suspected applications.

To accomplish the above-mentioned objects, according to a first aspect of the present invention, there is provided a system for detecting mobile cyber incidents, the system including: a mobile incident collection server adapted to collect text messages sent through communication company servers to produce text message detection information, to collect URL (Uniform Resource Locator) information based on real-time search words provided by search portals to produce URL detection information, and to collect basic information of application files being sold in application market servers to produce APK detection information; and a detection information DB (Database) adapted to receive, store and manage the text message detection information, the URL detection information and the APK detection information produced from the mobile incident collection server.

According to the present invention, preferably, the APK detection information includes at least one or more of application names, versions, sizes, uploader names, and authorization information.

According to the present invention, preferably, when the mobile incident collection server produces the text message detection information, the mobile incident collection server is accessed to the corresponding web pages by using the URL information contained in the text messages to check whether applications in the web pages are downloaded.

According to the present invention, preferably, when the mobile incident collection server collects the basic information of the applications being sold in the application market servers, the mobile incident collection server analyzes the relation between the collected applications and the previously analyzed applications to check whether the applications are repeated.

According to the present invention, preferably, the mobile incident collection server checks whether the collected applications are repeated with the previously analyzed applications on the basis of at least one or more information of the application names, versions, uploader names, and URL information.

To accomplish the above-mentioned objects, according to a second aspect of the present invention, there is provided a method for detecting mobile cyber incidents, the method including the steps of: allowing a mobile incident collection server to determine whether new text is received; extracting the text original hash from the received new text by means of the mobile incident collection server; allowing the mobile incident collection server to determine whether attached file exists on the basis of the extracted text original hash; if the attached file exists, extracting the attached file by means of the mobile incident collection server; and storing and managing the APP (Application) information of the extracted attached file as mobile cyber incident information in the mobile incident collection server.

According to the present invention, preferably, the method for detecting mobile cyber incidents further includes the steps of: extracting text sending information on the basis of the extracted text original hash by means of the mobile incident collection server; and extracting sending number, time, communication company and main phrases from the extracted text sending information and storing and managing the extracted information as the mobile cyber incident information in the mobile incident collection server.

According to the present invention, preferably, the method for detecting mobile cyber incidents further includes the steps of: extracting the text content from the extracted text original hash by means of the mobile incident collection server; parsing the URL of the extracted text content by means of the mobile incident collection server; and storing and managing the parsed information as the mobile cyber incident information in the mobile incident collection server.

To accomplish the above-mentioned objects, according to a third aspect of the present invention, there is provided a method for detecting mobile cyber incidents, the method including the steps of: allowing a mobile incident collection server to determine whether a search word collection period starts; if the search word collection period starts, calling a real-time search word collection API (Application Programming Interface) by portal by means of the mobile incident collection server; calling the number of search words by means of the mobile incident collection server; collecting the API-based real-time search words by portal by means of the mobile incident collection server; parsing the collected search words by means of the mobile incident collection server; and storing and managing the parsed search words as the mobile cyber incident information in the mobile incident collection server.

To accomplish the above-mentioned objects, according to a fourth aspect of the present invention, there is provided a method for detecting mobile cyber incidents, the method including the steps of: allowing a mobile incident collection server to determine whether a URL detection period starts; if the URL detection period starts, calling a search API by portal by means of the mobile incident collection server; calling collected search words by means of the mobile incident collection server; receiving the search results through the collected search words by means of the mobile incident collection server; parsing the search results and extracting the URL information from the parsed search results by means of the mobile incident collection server; allowing the mobile incident collection server to determine whether the search words not searched exist; and if the search words not searched exist, receiving the search results corresponding to the search words not searched by means of the mobile incident collection server.

According to the present invention, preferably, the method for detecting mobile cyber incidents further includes the steps of: after the mobile incident collection server parses the search results and extracts the URL information from the parsed search results, calling URL repetition collection limitation period by means of the mobile incident collection server; allowing the mobile incident collection server to determine whether URLs are collected; if the URLs are collected, allowing the mobile incident collection server to determine whether the collected URLs are the repetition collection limitation URLs; if it is determined that the collected URLs are the repetition collection limitation URLs, producing and storing URL and hash by means of the mobile incident collection server; and storing the basis information and setting repetition collection limitations by means of the mobile incident collection server.

According to the present invention, preferably, the method for detecting mobile cyber incidents further includes the steps of: analyzing the web page source of the extracted URL and extracting the URL downloading the application connected to the corresponding web page by means of the mobile incident collection server.

According to the present invention, preferably, the method for detecting mobile cyber incidents further includes the steps of: checking whether the URL is connected to other web pages by means of the mobile incident collection server; and allowing the mobile incident collection server to determine whether the URL automatically visits the corresponding web page to download the applications connected to the web page.

According to the present invention, preferably, the method for detecting mobile cyber incidents further includes the step of: allowing the mobile incident collection server to check whether the collected applications are repeated with each other to check the relations of the collected applications with the existing analyzed applications.

According to the present invention, preferably, the relations of the collected applications with the existing analyzed applications are checked to check whether at least one or more information of the application names, versions, uploader names, and URL information are similar to or the same as each other.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, if the terminologies used herein fail to accurately indicate the scope of the invention, they should be replaced with the terminologies understood correctly by those skilled in the art. Furthermore, the terminologies used herein should be interpreted according to the context under the definition of the dictionary, and accordingly, they are not interpreted as meaning reduced excessively.

The terminology used herein is for the purpose of describing particular embodiments only and is not intended to be limiting. The term 'a' or 'an', as used herein, are defining as one or more than one. The term 'including' and/or 'having', as used herein are intended to refer to the above features, numbers, steps, operations, elements, parts or combinations, and it is to be understood that the terms are not intended to preclude the presence of one or more features, numbers, steps, operations, elements, parts or combinations and added possibilities.

The present invention is disclosed with reference to the attached drawings wherein the corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description.

Figure 1:
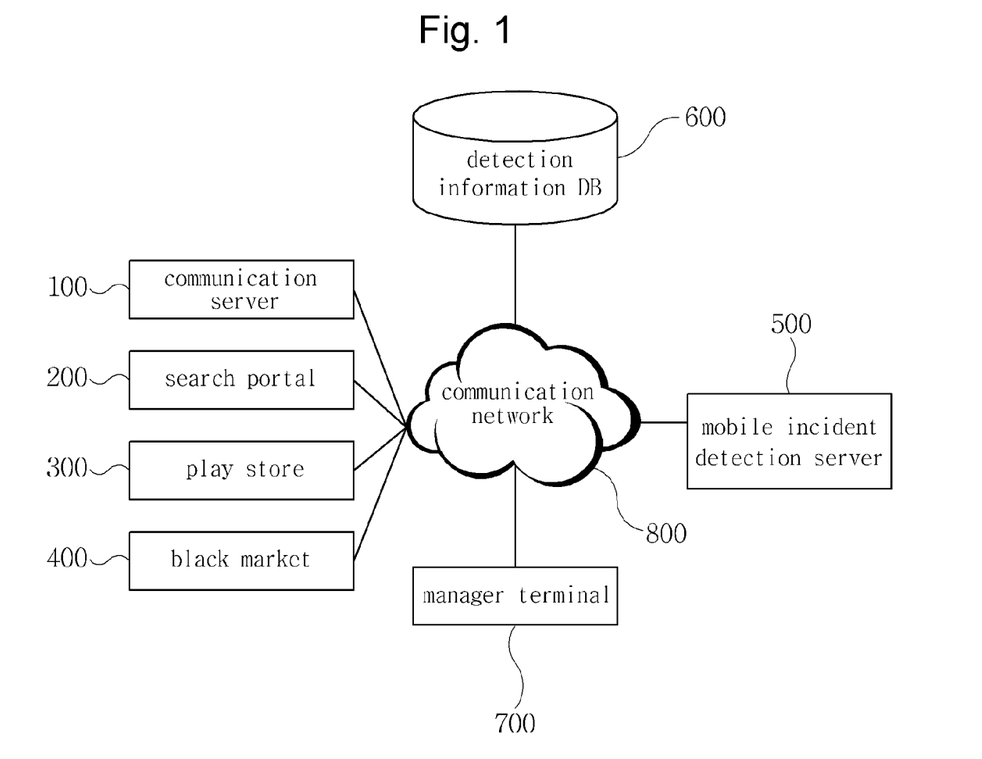
FIG. 1 is a block diagram showing a system for detecting mobile cyber incidents according to the present invention.

FIG. 1 is a block diagram showing a system for detecting mobile cyber incidents according to the present invention.

As shown in FIG. 1, a system for detecting mobile cyber incidents according to the present invention includes: a mobile incident collection server 500 adapted to collect text messages sent through communication company servers 100 to produce text message detection information, to collect URL information based on real-time search words provided by search portals 200 to produce URL detection information, and to collect basic information of application files being sold in play stores 300 and black markets 400 to produce APK detection information; a detection information DB 600 adapted to receive, store and manage the text message detection information, the URL detection information and the APK detection information produced from the mobile incident collection server 500; a manager terminal 700 adapted to provide collection conditions for collecting detection information to the mobile incident collection server 500; and a communication network 800 adapted to build communication environments among the mobile incident collection server 500, the communication company servers 100, the search portals 200, the play stores 300, the black markets 400, the detection information DB 600 and the manager terminal 700.

The APK detection information includes application names, versions, sizes, uploader names, and authorization information.

When the mobile incident collection server 500 produces the text message detection information, it is accessed to the corresponding web page by using the URL information contained in the text message to check whether an application is downloaded or not.

When the mobile incident collection server 500 collects the basic information of the applications being sold in the play stores 300 and the black markets 400 as application market servers, it analyzes the relation between the collected applications and the previously analyzed applications to check whether they are repeated with each other.

The mobile incident collection server 500 checks whether the collected applications are repeated with the previously analyzed applications on the basis of the application names, versions, uploader names, and URL information.

Figure 2:
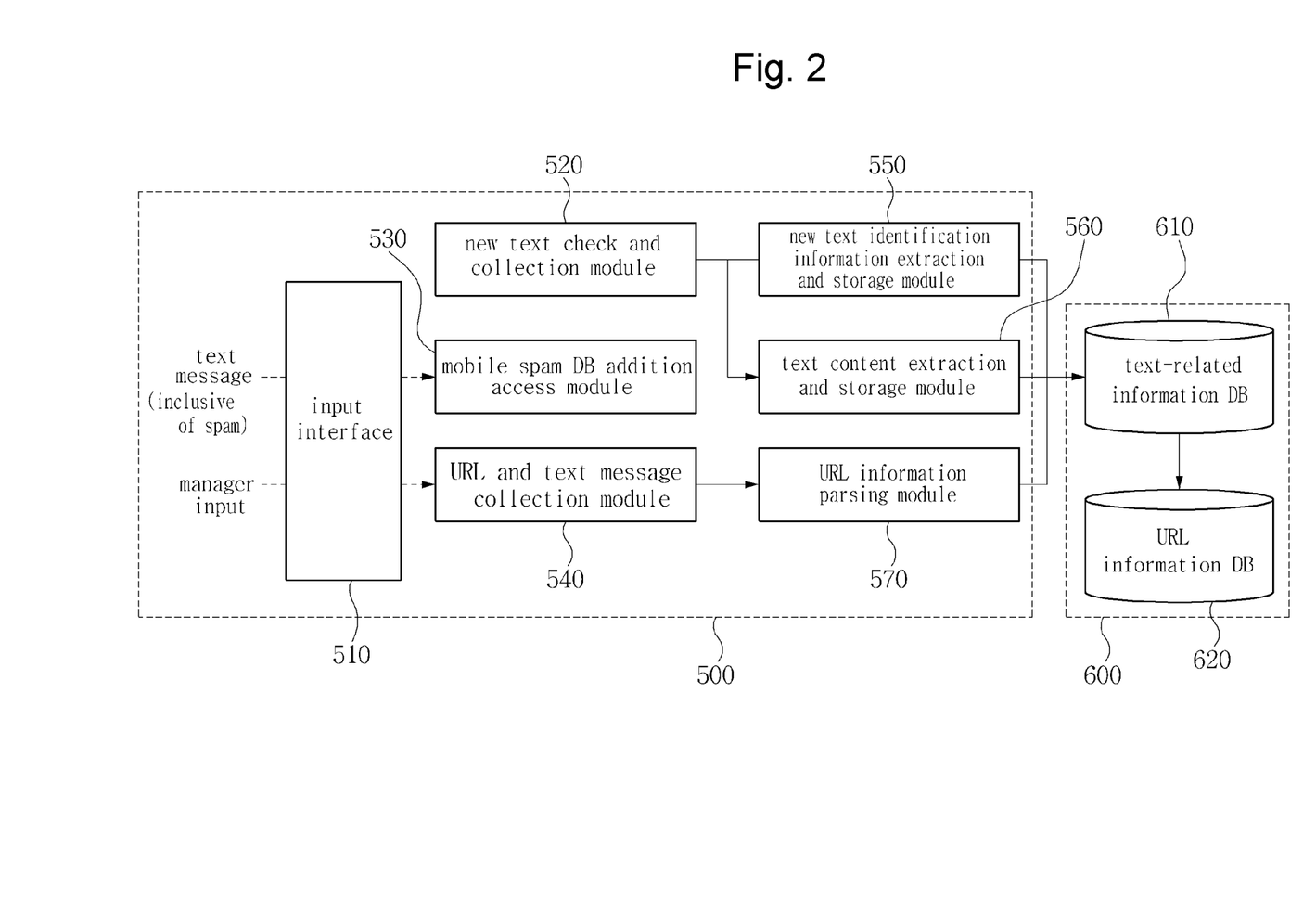
FIG. 2 is a block diagram showing the configuration for text message processing and text content extraction of a mobile incident collection server of FIG. 1.

Referring schematically to FIG. 2 showing the configuration for text message processing and text content extraction in the mobile incident collection server 500, an input interface 510 receives text messages sent through spam management servers (not shown) or the communication company servers 100 to provide the text messages to a new text check and collection module 520 through a mobile spam DB addition access module 530.

Further, the input interface 510 receives manager input through the manager terminal 700 to provide the manager input to a URL and text message collection module 540.

The input interface 510 can receive the text messages through an external system (not shown). At this time, the external system receives texts reported as spam from an SMS spam trap system built in KISC (Korea Internet Security Center) and the communication company servers 100.

Further, the input interface 510 receives the web interface input of the manager and the text file input of the system.

The text messages collected from the external system like the communication company servers 100 are received as text files in unit of time, and each text message is indicated by one line and filled in the order of the collected time from the external system, sender telephone number, sender communication company, and text message content. The information is divided into TAB, and upon the development of system, the information can be extracted on the basis of TAB (\t) and line breaking (\n).

If the mobile spam DB addition access module 530 collects the original copies of the text messages using the input interface 510, the information is collected in the unit of every time, checks the connection of the external system in the unit of every time, selects the original copies of the text messages from the table in which the text messages are stored after the connection is checked, and receives the selected information.

The new text check and collection module 520 periodically checks whether the information received from the external system exists or not, and if there is no file recently produced after the collection time on the basis of DB new information and FTP (File Transfer Protocol) new creation file (which corresponds only to an FTP system), the new text check and collection module 520 checks the file production in the unit of every five minutes.

A new text identification information extraction and storage module 550 checks the original copies of the text messages to input the information needed by the system to DB and applies ID to the text messages of the index table for the text messages. At this time, time information, sender telephone number information, and communication company information are extracted and inputted to the DB.

A text content extraction and storage module 560 extracts text message content information, performs URL extraction, issues and stores URL index ID, extracts only the contents from the original copies of the text messages collected to produce and manage separate hash values, checks whether the phrases related to URL from the extracted texts exist or not, and if similar information using start information of URL is checked, transmits the similar information to a URL information parsing module 570.

The URL information parsing module 570 checks the URL information existing in the text messages to extract the URL phrases, starts URL detection if a given string exists through the check of the start portion of the URL, checks the string after the URL detection has started to check the ending point of the URL, selects the string whose URL detection is finished as an URL phrase, issues URL index to the selected URL phrase, manages repeated information, and checks whether shortened URL exists or not.

Under the above-mentioned configuration, an explanation on a method for detecting mobile cyber incidents will be given with respect to FIGS. 3 and 4.

(Text Message Collection Routine)

Figure 3:
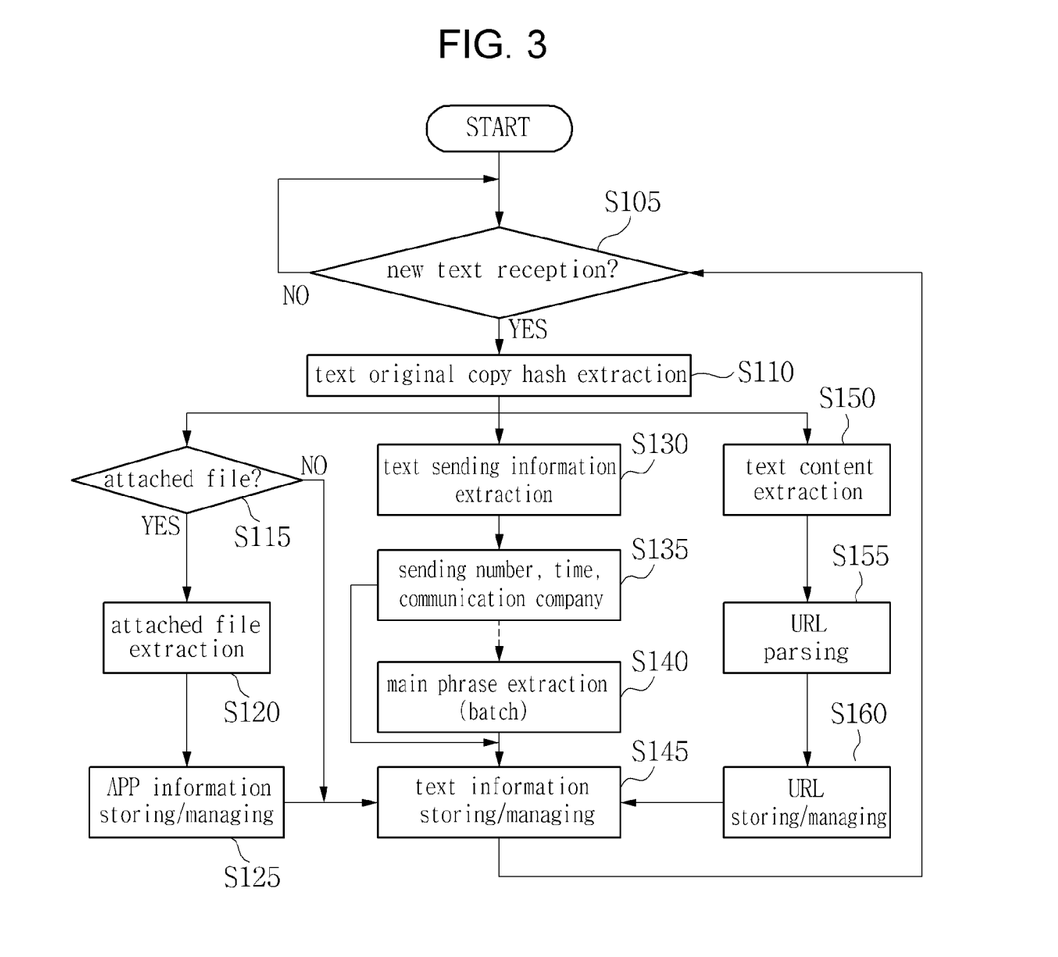
FIG. 3 is a flow chart showing a text message collection routine in a method for detecting mobile cyber incidents according to the present invention.

FIG. 3 is a flow chart showing a text message collection routine in a method for detecting mobile cyber incidents according to the present invention.

As shown in FIG. 3, a text message collection routine in a method for detecting mobile cyber incidents according to the present invention is carried out by allowing the mobile incident collection server 500 to determine whether new text is received (at step S105) and extracting the text original hash from the received new text if the new text is received (at step S110).

Next, the mobile incident collection server 500 determines whether attached file exists or not on the basis of the extracted text original hash (at step S115), and if the attached file exists, the mobile incident collection server 500 extracts the attached file (at step S120).

After that, the mobile incident collection server 500 stores and manages the APP information of the extracted attached file as mobile cyber incident information (at step S125).

On the other hand, the mobile incident collection server 500 extracts text sending information on the basis of the extracted text original hash (at step S130) and extracts sending number, time, communication company and main phrases from the extracted text sending information to store and manage the extracted information as the mobile cyber incident information (at steps S135 to S145).

Finally, the mobile incident collection server 500 extracts the text content from the extracted text original hash (at step S150), parses the URL of the extracted text content (at step S155), and stores and manages the parsed information as the mobile cyber incident information (at step S160).

(Search Portal-Based URL Collection Routine)

Figure 4:
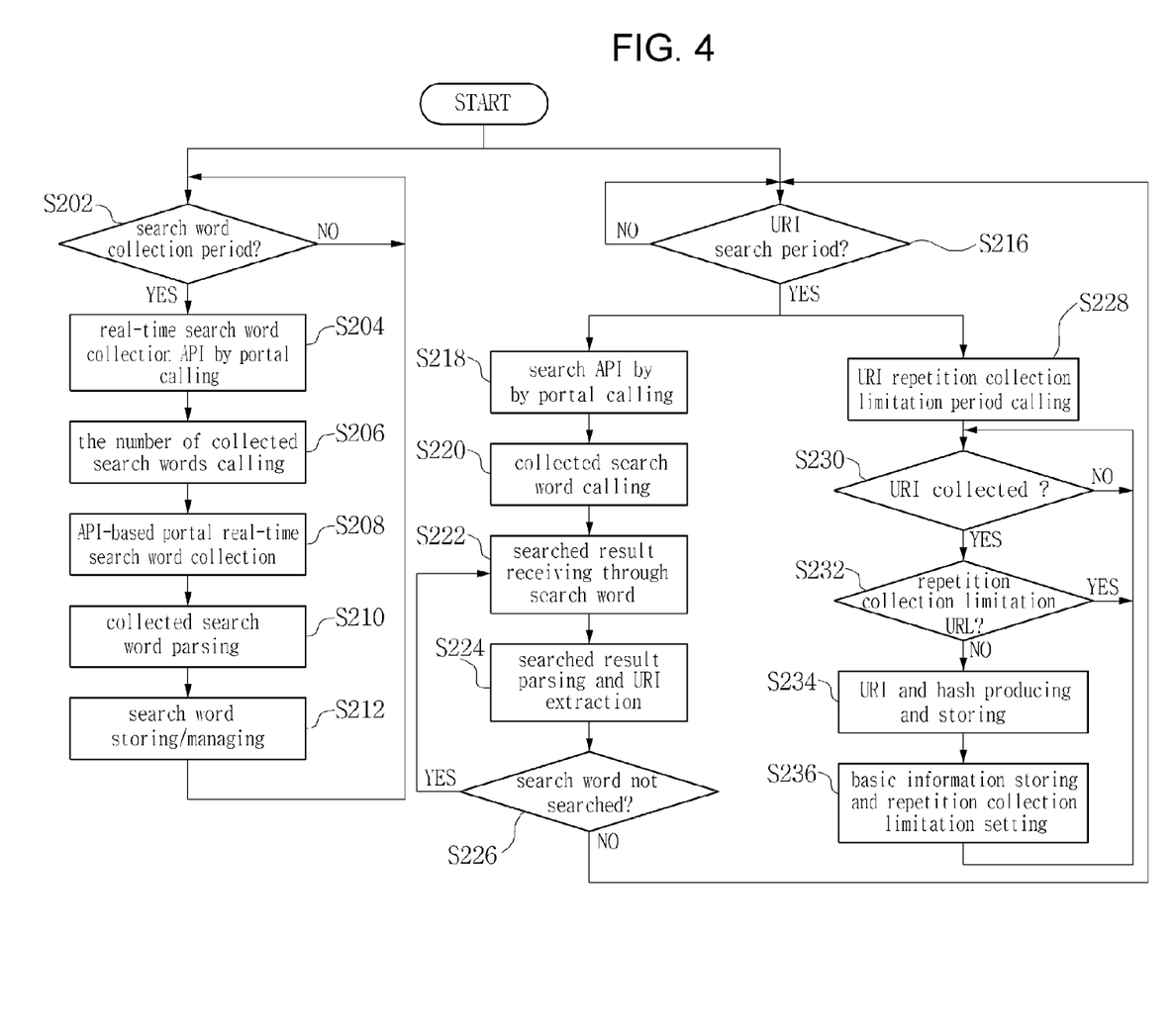
FIG. 4 is a flow chart showing a search portal-based URL collection routine in the method for detecting mobile cyber incidents according to the present invention.

FIG. 4 is a flow chart showing a search portal-based URL collection routine in the method for detecting mobile cyber incidents according to the present invention.

As shown in FIG. 4, the mobile incident collection server 500 determines whether a search word collection period starts or not (at step S202), and if the search word collection period starts, the mobile incident collection server 500 calls a real-time search word collection API by portal (at step S204).

After the mobile incident collection server 500 calls the search word collection API, it calls the number of search words (at step S206). Next, after the mobile incident collection server 500 collects the API-based real-time search words by portal (at step S208), it parses the collected search words (at step S210) and stores and manages the parsed search words as the mobile cyber incident information (at step S212).

On the other hand, the mobile incident collection server 500 determines whether a URL detection period starts or not (at step S216), and if the URL detection period starts, the mobile incident collection server 500 calls a search API by portal (at step S218).

Next, the mobile incident collection server 500 calls collected search words (at step S220), receives the search results through the collected search words (at step S222), and parses the search results and extracts the URL information from the parsed search results (at step S224).

The mobile incident collection server 500 determines whether the search words not searched exist or not (at step S226), and if the search words not searched exist, it receives the search results corresponding to them (at step S222).

Finally, the mobile incident collection server 500 calls URL repetition collection limitation period (at step S228) and determines whether URLs are collected or not (at step S230). If the URLs are collected, the mobile incident collection server 500 determines whether the collected URLs are the repetition collection limitation URLs (at step S232).

After that, if it is determined that the collected URLs are the repetition collection limitation URLs, the mobile incident collection server 500 produces and stores URL and hash (at step S234) and stores the basis information and sets repetition collection limitations (at step S236).

At this time, the mobile incident collection server 500 analyzes the web page source of the extracted URL and extracts the URL downloading the application connected to the web page. The mobile incident collection server 500 checks whether the URL is connected to other web pages, and after that, it determines whether the URL automatically visits the corresponding web page to download the applications connected to the corresponding web page. Accordingly, the mobile incident collection server 500 checks whether the collected applications are repeated with each other to check the relations of the collected applications with the existing analyzed applications. In this case, the collected applications may be similar to or the same as the existing analyzed applications through the comparison of application names, versions, uploader names, and URL information therebetween.

As described above, the system and method for detecting mobile cyber incidents according to the present invention collects information on all of paths through which mobile malicious code spreads to detect the mobile cyber incidents generated from the mobile malicious code.

Moreover, the system and method for detecting mobile cyber incidents according to the present invention informs applications suspected on malicious behavior and the information on the applications to a manager and conducts manual analysis only for the suspected applications.

Furthermore, the system and method for detecting mobile cyber incidents according to the present invention provides the stability in application analysis and the sharing system in the detected information, thus dynamically handling the mobile cyber incidents to occur.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for detecting mobile cyber incidents, the method comprising the steps of:

allowing a mobile incident collection server to determine whether new text message is received;

retrieving the text message original hash from the received new text message by means of the mobile incident collection server;

allowing the mobile incident collection server to determine whether attached application file exists on the basis of the retrieved text message original hash;

if the attached application file exists, retrieving the attached application file by means of the mobile incident collection server; and storing and managing the attached application file information of the retrieved attached application file as mobile cyber incident information in the mobile incident collection server;

retrieving text message sending information on the basis of the retrieved text message original hash by means of the mobile incident collection server; and retrieving sending phone number, time, communication company and main phrases from the retrieved text message sending information and storing and managing the retrieved text message sending information as the mobile cyber incident information in the mobile incident collection server;

retrieving the text message content from the retrieved text message original hash by means of the mobile incident collection server;

parsing a Uniform Resource Locator (URL) of the retrieved text message content by means of the mobile incident collection server; and storing and managing the parsed URL as the mobile cyber incident information in the mobile incident collection server.

* * * * *